(12) United States Patent
Kamiyama

(10) Patent No.: US 7,696,463 B2
(45) Date of Patent: Apr. 13, 2010

(54) PHOTOSENSOR CIRCUIT PRESENTING LINEAR AND LOGARITHIMIC OUTPUT CHARACTERISTICS AND IMAGE SENSOR USING THE SAME

(75) Inventor: Tomoyuki Kamiyama, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 609 days.

(21) Appl. No.: 11/565,208

(22) Filed: Nov. 30, 2006

(65) Prior Publication Data

US 2007/0126903 A1 Jun. 7, 2007

(30) Foreign Application Priority Data

Dec. 1, 2005 (JP) ............................ 2005-348471
Dec. 1, 2005 (JP) ............................ 2005-348477

(51) Int. Cl.
*H01L 27/00* (2006.01)
(52) U.S. Cl. ................ 250/208.1; 250/214 A; 348/302; 348/308
(58) Field of Classification Search .............. 250/208.1, 250/214 A; 348/302, 308
See application file for complete search history.

(56) References Cited

U.S. PATENT DOCUMENTS

| 6,909,462 B1 * | 6/2005 | Shinotsuka et al. | ......... 348/308 |
| 6,958,775 B1 * | 10/2005 | Shinotsuka et al. | ......... 348/302 |
| 2009/0147119 A1 * | 6/2009 | Kamiyama et al. | ......... 348/308 |

FOREIGN PATENT DOCUMENTS

JP 2000-329616 11/2000

* cited by examiner

*Primary Examiner*—Seung C Sohn
(74) *Attorney, Agent, or Firm*—Rankin, Hill & Clark LLP

(57) ABSTRACT

Photosensor circuit includes: a photoelectric conversion element; a first MOS transistor for converting a current signal into a voltage signal, a first capacitor element; a second capacitor element; a second MOS transistor for controlling charge transfer from the first capacitor element to the second capacitor element; and a control section for supplying gate voltages and drain voltages to the first and second MOS transistors. The control section performs initial setting and voltage control such that the charge transfer can be carried out efficiently for setting of the gate voltages and drain voltages to be supplied the first and second MOS transistors. Time length of the charge transfer is set so as not to exceed 100 μsec.

6 Claims, 13 Drawing Sheets

RELATIONSHIP AMONG GATE VOLTAGE (Vg1M) & THRESHOLD VOLTAGE (Vth1)
OF TRANSISTOR Q1 & TERMINAL VOLTAGE (VC1) OF PHOTODIODE

RELATIONSHIP AMONG GATE VOLTAGE (Vg1M) & THRESHOLD VOLTAGE (Vth1)
OF TRANSISTOR Q1 & TERMINAL VOLTAGE (VC1) OF PHOTODIODE

RELATIONSHIP AMONG GATE VOLTAGE (Vg1M) & THRESHOLD VOLTAGE (Vth1)
OF TRANSISTOR Q1 & TERMINAL VOLTAGE (VC1) OF PHOTODIODE

RELATIONSHIP AMONG GATE VOLTAGE (Vg1M) & THRESHOLD VOLTAGE (Vth1)
OF TRANSISTOR Q1 & TERMINAL VOLTAGE (VC1) OF PHOTODIODE

RELATIONSHIP AMONG GATE VOLTAGE (Vg1M) & THRESHOLD VOLTAGE (Vth1)
OF TRANSISTOR Q1 & TERMINAL VOLTAGE (VC1) OF PHOTODIODE

DIFFERENCE BETWEEN POTENTIAL SETTINGS OF MIDIUM GATE VOLTAGE (Vg1M)
& LOW GATE VOLTAGE (Vg1L)

PHOTOSENSOR CIRCUIT PRESENTING LINEAR AND LOGARITHIMIC OUTPUT CHARACTERISTICS AND IMAGE SENSOR USING THE SAME

FIELD OF THE INVENTION

The present invention relates generally to photosensor circuits and image sensors using the photosensor circuits, and more particularly to an improved photosensor circuit which presents linear output characteristics and logarithmic output characteristics corresponding to an intensity of incident light, can achieve an enhanced sensitivity by enhancing electrical charge transfer and thus is suited to achieve a MOS-type image sensor of a wide dynamic range, as well as an image sensor with its each pixel implemented by the improved photosensor circuit.

BACKGROUND OF THE INVENTION

Among various types of photosensor circuits that implement individual pixels of MOS-type image sensors are a type presenting linear output characteristics in response to variation in intensity (or illuminance) of incident light, and a type presenting logarithmic output characteristics in response to variation in intensity of incident light. The following paragraphs outline these types of photosensor circuits and explain their characteristics in terms of an S/N ratio, dynamic range, afterimage, sensitivity in a low-intensity light condition, etc.

FIG. 16 is a diagram showing an example construction of the photosensor circuit presenting linear output characteristics. The photosensor circuit 101 of FIG. 16 includes a photodiode PD provided as a photosensor element (i.e., photo-electric conversion element) for detecting incident light (light signal) L1 and converting the detected incident light L1 into an electrical signal. The photodiode PD includes a capacitor C1 that is implemented with parasitic capacitance (including floating or stray capacitance of wiring). The photosensor circuit 101 further includes a MOS transistor Q1 for charging and discharging the capacitor C1, a MOS transistor Q2 for amplifying a terminal voltage of the capacitor C1, and a MOS transistor Q3 for selectively outputting the amplified terminal voltage (Vout) as a pixel signal. Resistor R is connected to a drain terminal of the MOS transistor Q3.

Given voltages V1 and V2 are applied, by a voltage controller 102, to a gate terminal G1 and drain terminal D1, respectively, of the MOS transistor Q1. Further, given voltages V3 and V4 are applied, by the voltage controller 102 (and a pixel selection circuit etc.), to a gate terminal G3 of the MOS transistor Q3 and outer terminal T1 of the resistor R, respectively. Generation timing at which the voltages V1-V4 are generated via the voltage controller 102 is instructed by a timing signal generation section 103.

The photosensor circuit 101 behaves as follows. The gate voltage V1 of the MOS transistor Q1 is switched to a high level at predetermined initialization timing with the drain voltage V2 of the MOS transistor Q1 kept at a high level, so that an electrical charge remaining in the capacitor C1 of the photodiode PD is discharged to the drain of the MOS transistor Q1. Then, the gate voltage V1 is switched to a low level (0 volt) to turn off the MOS transistor Q1. After that, the capacitor C1 of the photodiode PD is caused to store an electrical charge. Terminal voltage produced in the capacitor C1 by the electrical charge storage is applied to a gate of the transistor Q2. Then, once the MOS transistor Q3 is turned on upon lapse of a predetermined light exposure time in the photodiode PD, a light signal is output, as the voltage Vout, from a drain of the MOS transistor Q3.

In the aforementioned photosensor circuit 101, a photo-electric current flowing through the photodiode PD is controlled by a discharge current of the charge stored in the capacitor C1 of the photodiode PD. Thus, the output voltage Vout, which is a sensor output of the photosensor circuit 101, presents linear output characteristics proportional to the discharge current. Because the photosensor circuit 101 arranged in the aforementioned manner can control the sensor output on the basis of the light exposure time, it can function as part of a storage-type image sensor. However, because the output voltage Vout is proportional to the intensity of the incident light L1, it would get saturated when strong-intensity light is input, and thus, the photosensor circuit 101 can not achieve a wide dynamic range.

Photosensor circuit similar in construction to the aforementioned photosensor circuit 101 is disclosed, for example, in JP-2000-329616 A.

FIG. 17 is a diagram showing an example construction of the photosensor circuit of the type presenting logarithmic output characteristics. In FIG. 17, elements substantially identical to the above-described elements of FIG. 16 are indicated by the same reference characters as in FIG. 16 and will not be detailed to avoid unnecessary duplication. The photosensor circuit 201 of FIG. 17 includes a MOS transistor Q21 in place of the MOS transistor Q1, and the MOS transistor Q21 has a gate electrically connected to its drain. Photodiode PD, capacitor C1, MOS transistors Q2 and Q3, resistor R and other circuit elements are identical to those described above in relation to FIG. 16. In the photosensor circuit 201, a sensor current of the photodiode PD is converted, by the MOS transistor Q21, into a sensor voltage having logarithmic characteristics in a weak inversion state.

In the photosensor circuit 201, the gate of the MOS transistor Q21 is electrically connected to its drain as noted above so that a drain voltage and gate voltage are set at a same predetermined voltage level, and the MOS transistor Q3 is turned on so that the light signal is detected as the output voltage Vout. High-level gate voltage is supplied, by the voltage controller 102, to the gate terminal G3 of the MOS transistor Q3.

The photosensor circuit 201 can achieve a wide dynamic range by virtue of its logarithmic output characteristics. However, with the photosensor circuit 201, where a photoelectric current flows via the channel of the MOS transistor Q21, it is not possible to improve the S/N ratio by increasing the light exposure time as achieved by the storage-type image sensor. Therefore, the photosensor circuit 201 would present a poorer sensitivity in a low-intensity light condition than the storage-type image sensor implemented by the aforementioned photosensor circuit 101. Further, when the current flowing to the MOS transistor Q21 is of a low level, the photosensor circuit 201 tends to produce an unwanted afterimage because impedance of the channel of the MOS transistor Q21 increases.

Example of the photosensor circuit of the presenting logarithmic output characteristics is disclosed in JP-2000-329616 A.

As noted above, the photosensor circuit of the type presenting linear output characteristics can not achieve a wide dynamic range because its detection signal is proportional to the intensity of incident light and gets saturated when strong light is input. Further, the photosensor circuit of the type presenting logarithmic output characteristics presents a poor sensitivity in a low-intensity light condition, and, when the current flowing to the MOS transistor Q21 is of a low level, it tends to produce an afterimage due to an increased impedance of the channel of the MOS transistor Q21.

SUMMARY OF THE INVENTION

In view of the foregoing prior art problems, it is an object of the present invention to provide an improved photosensor circuit which presents linear output characteristics in response to incident light of a low intensity and presents logarithmic output characteristics in response to incident light of a high intensity, which allows its linear output range to be set as desired to thereby minimize operational differences with other similar photosensor circuits used together with the photosensor circuit, which can enhance an S/N ratio in a low-intensity light condition etc., which can achieve an enhanced sensitivity by enhancing storage of a signal charge in a charge-storing capacitor at the time of sample/hold operation and which can achieve an increased dynamic range by preventing sensor saturation, as well as an image sensor using such a photosensor circuit.

In order to accomplish the above-mentioned object, the present invention provides a photosensor circuit, which comprises: a photoelectric conversion element for converting a light signal into a current signal; a first MOS transistor for converting the current signal, output by the photoelectric conversion element, into a voltage signal having a logarithmic characteristic in a weak inversion state; a first capacitor element connected to a voltage detection terminal of the photoelectric conversion element; a second capacitor element for keeping the voltage signal; a second MOS transistor for controlling electrical charge transfer between the first capacitor element and the second capacitor element; and a control section for supplying gate voltages and drain voltages to the first MOS transistor and the second MOS transistor. The control section performs voltage control to: set the drain voltage of the first MOS transistor at a high voltage value (VdH) only for a first predetermined time period, set the gate voltage of the first MOS transistor and the gate voltage of the second MOS transistor at respective high voltage values (Vg1H and Vg2H) only for a second predetermined time period and control charge or discharge of the second capacitor element, provided for storing the electrical charge as a light signal, to thereby set the capacitor element at a predetermined potential; then set the drain voltage of the first MOS transistor at a low voltage value (VdL) after turning off the second MOS transistor to place the second capacitor element in an opened state and set the gate voltage of the first MOS transistor at a medium potential (Vg1M) to thereby discharge the electrical charge of the first capacitor element; then set the drain voltage of the first MOS transistor at the high voltage value (VdH) and then, after passage of a third predetermined time, set the gate voltage of the first MOS transistor at a low voltage (Vg1L) and set the high voltage value (VdH) and medium potential (Vg1M) so as to satisfy relationship of Vg1M−VdH<Vth1 and Vg1M−VdL>Vth1, where Vth1 represents a threshold voltage of the first MOS transistor; then, after passage of a fourth predetermined time, set the gate voltage of the second MOS transistor at a predetermined voltage (Vg2M) only for a fourth predetermined time period and set the medium potential (Vg1M) and predetermined voltage (Vg2M) so as to satisfy relationship of Vg1M<Vg2M<Vg1M+Vth2 where Vth2 represents a threshold voltage value of the second MOS transistor, to thereby transfer the electrical charge of the first MOS transistor to the second MOS transistor; and then set a terminal voltage of the second MOS transistor after turning off the second MOS transistor to place the second capacitor element in the opened state.

When light has been input to the photoelectric conversion element, an electrical charge is stored into the first capacitor element, in accordance with an intensity of the input or incident light, on the basis of the operation of the first MOS transistor, and the electrical charge is transferred from the first capacitor element to the second capacitor element on the basis of the operation of the second (or charge-transferring) MOS transistor. Because, in the present invention, the charge-storing potential of the second MOS transistor is set to be higher than the potential of the first capacitor element at the time of the electrical charge transfer, the electrical charge stored in the first capacitor element can be transferred efficiently to the second MOS transistor. Thus, the present invention allows the electrical charge, stored in the first capacitor element, to be used efficiently, enhance the storage of the signal charge in the second or charge-storing capacitor at the time of sample/hold operation and thereby enhance the sensitivity of the photosensor circuit.

Further, the photosensor circuit of the present invention, which presents either of linear output characteristics and logarithmic output characteristics depending on the intensity of the incident light, can control a varying point between a linear output characteristic region and a logarithmic output characteristic region, can stably prevent non-uniformness or differences in potential at the varying point with other similar photosensor circuits used together with the photosensor circuit, can enhance the S/N ratio in a low-intensity light condition etc., can achieve an enhanced sensitivity, can achieve an increased dynamic range and can minimize afterimages.

In a preferred embodiment, the control section switches the medium potential and low voltage of the first MOS transistor to desired levels. In a preferred embodiment, the photosensor circuit further comprises a third MOS transistor for amplifying the terminal voltage of the second MOS transistor.

In a preferred embodiment, the photosensor circuit further comprises a fourth MOS transistor for selectively outputting a voltage signal output by the third MOS transistor.

In a preferred embodiment, the fourth predetermined time period is set so as not to exceed 100 μsec.

According to another aspect of the present invention, there is provided an image sensor which comprises an image pickup region having a plurality of pixels each implemented by the above-discussed photosensor circuit of the present invention.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
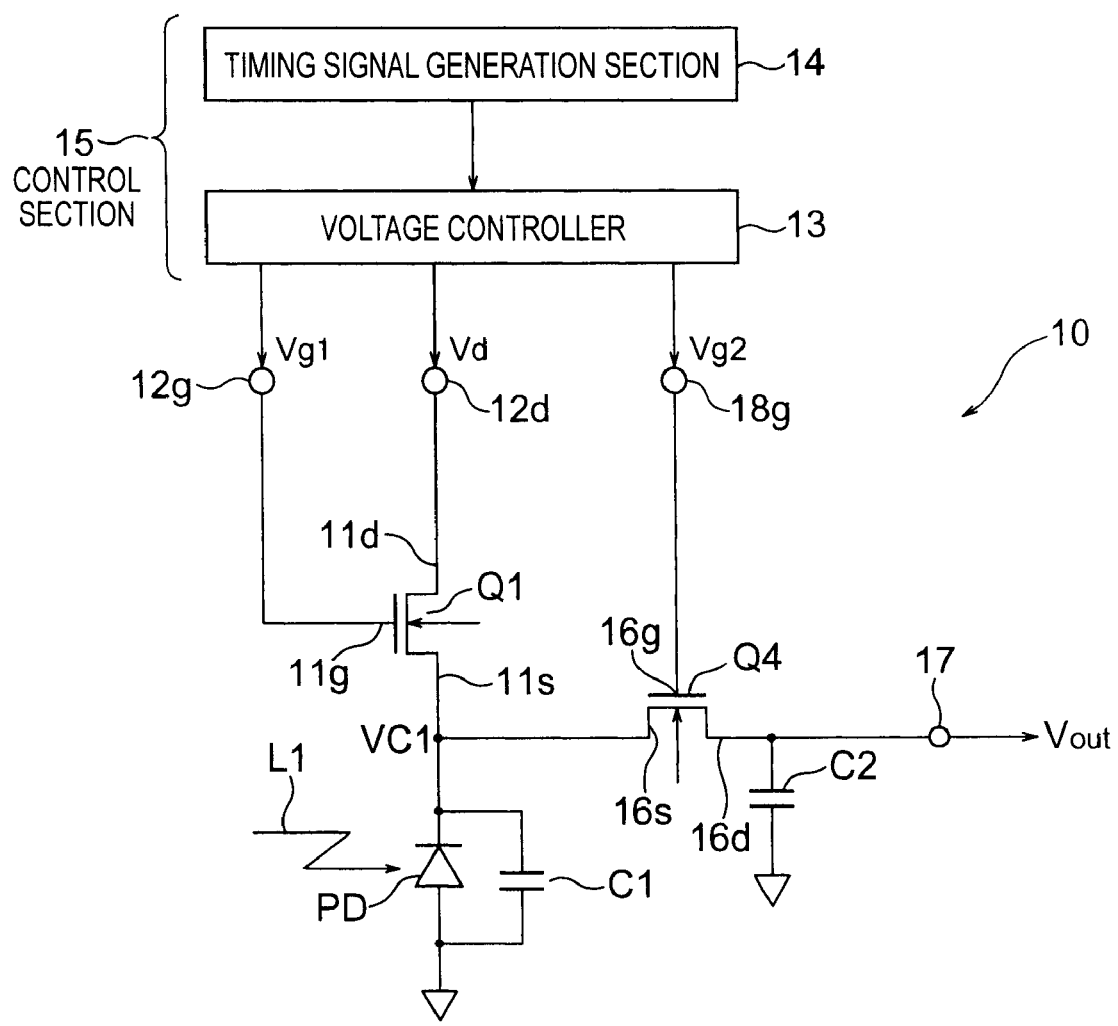
FIG. 1 is a circuit diagram showing an example construction of a photosensor circuit according to a first embodiment of the present invention.
Figure 16:
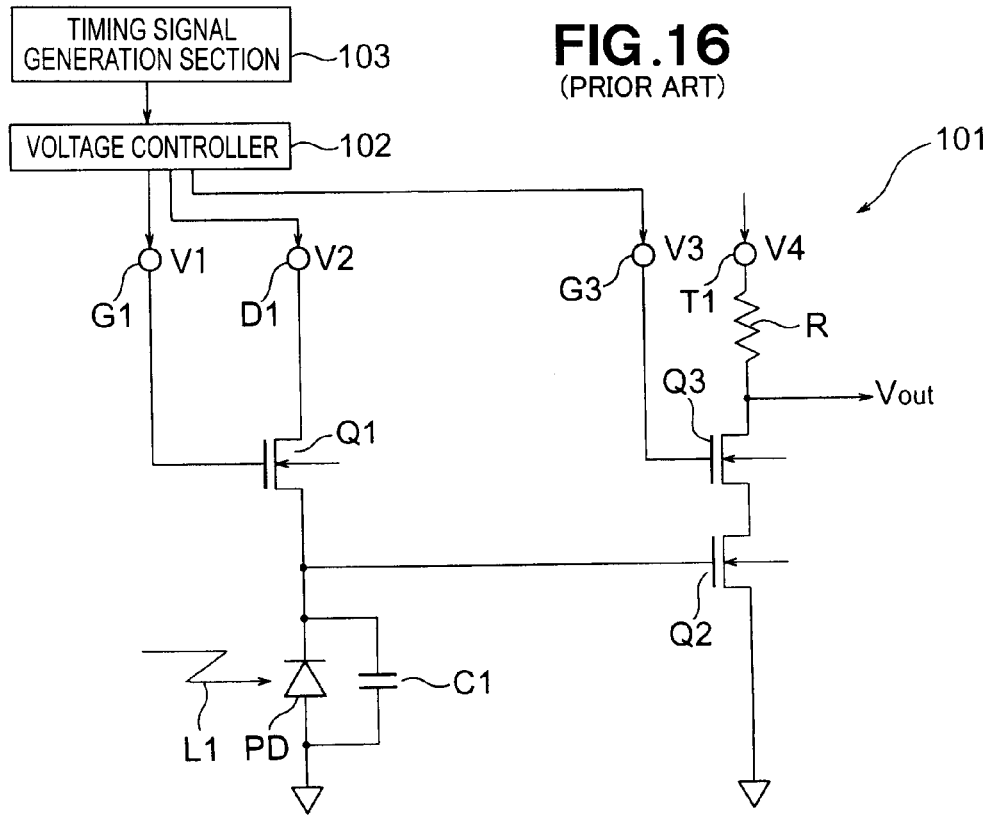
FIG. 16 is a diagram showing an example construction of a conventional photosensor circuit having linear output characteristics.
Figure 17:
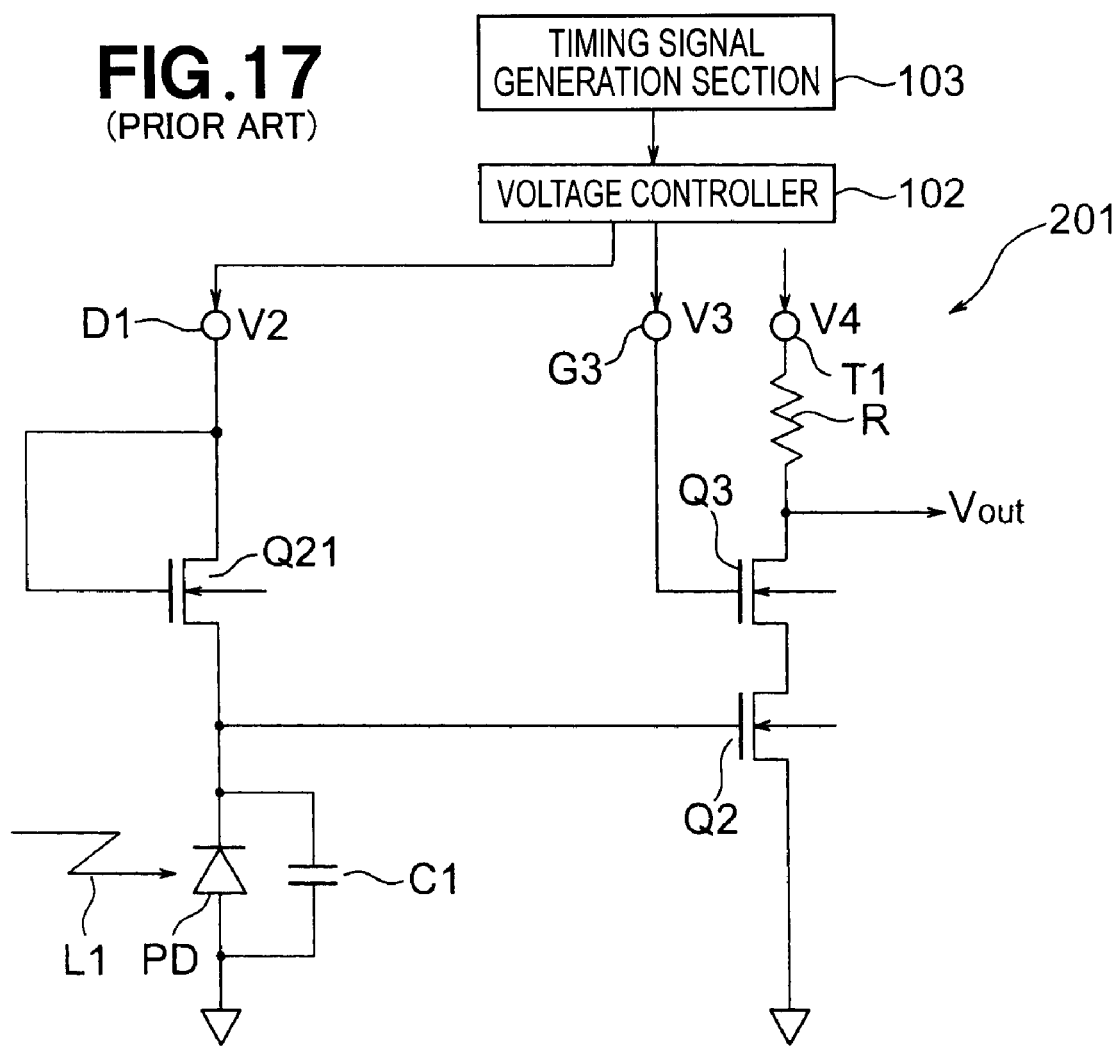
FIG. 17 is a diagram showing an example construction of a conventional photosensor circuit having logarithmic output characteristics.

First, a description will be given about a photosensor circuit in accordance with a first embodiment of the present invention, with reference to FIGS. 1-12. FIG. 1 shows an example construction of the photosensor circuit according to the first embodiment. In FIGS. 1-12, elements substantially identical to the elements described above in the BACKGROUND OF THE INVENTION section are indicated by the same reference characters as in FIGS. 16 and 17.

In FIG. 1, the photosensor circuit 10 includes a photodiode PD that is a photosensor element (or photoelectric conversion element) for detecting incident light L1 and converting the detected incident light L1 into an electrical signal, and a capacitor C1 that is implemented with parasitic capacitance (including floating or stray capacitance of wiring). The capacitor C1 is connected between an anode and cathode of the photodiode PD in parallel to thereto and thereby connected to a voltage detection terminal (i.e., cathode) of the photodiode PD. Note that the photodiode PD is just an example of a photosensor element usable in the instant embodiment and any other suitable photosensor element may be used.

Converting MOS transistor Q1 is connected to the photodiode PD for converting a sensor current, output from the photodiode PD, into a sensor voltage that presents logarithmic characteristics in a weak inversion state. The MOS transistor Q1 has a drain 11d, source 11s and gate 11g, and the cathode of the photo diode PD is connected to the source 11s of the converting MOS transistor Q1 while the anode of the photodiode PD is connected to a ground or earth terminal. Drain voltage Vd and gate voltage Vg1 are supplied by a voltage controller 13 to a drain terminal 12d and gate terminal 12g, respectively, of the MOS transistor Q1.

The photosensor circuit 10 further includes a charge-storing capacitor C2 for storing an electrical charge, and a MOS transistor Q4 for transferring an electrical charge. The MOS transistor Q4 is a charge-transistor MOS transistor for selectively transferring an electrical charge from the capacitor C1 to the capacitor C2, and this charge-transferring MOS transistor Q4 is also called "shutter transistor".

When the MOS transistor Q4 has been turned on, the photosensor circuit 10 senses incident light L1 and samples and holds the sensed light (signal) L1 as a voltage signal. The sample/hold function of the photosensor circuit 10 is also called "shutter function".

The MOS transistor Q4 has a source 16s connected to the cathode of the photodiode PD, and a drain 16d functioning as an output terminal 17 for outputting a sensor signal. Gate voltage Vg2 is supplied by the voltage controller 13 to a gate terminal 18g of a gate 16g of the charge-transferring MOS transistor Q4.

Supply timing of the voltages Vd, Vg1 and Vg2, to be supplied by the voltage controller 13, is instructed by a timing signal generation section 14, and respective levels of the voltages Vd, Vg1 and Vg2 at each predetermined time point are set in advance. Respective voltage waveforms of the voltages Vd, Vg1 and Vg2 to be supplied by the voltage controller 13 are shown in a timing chart of FIG. 2. The voltage controller 13 and timing signal generation section 14 together constitute a control section 15 having an initial setting function and voltage control function.

Operational states of the MOS transistors Q1 and Q2 are set and controlled on the basis of the levels of the voltages Vd, Vg1 and Vg2 supplied by the voltage controller 13. In this way, the behavior of the photosensor circuit 10 is controlled so that the aforementioned shutter function is achieved.

Now, a description will be given about the behavior of the photosensor circuit 10. Once light L1 is input to the photodiode PD, a sensor current flows through the photodiode PD in accordance with the intensity (or illuminance) of the light L1. Electrical charge of the sensor current is stored in the capacitor C1, converted into a sensor voltage and then retained as a terminal voltage (VC1) of the capacitor C1. The MOS transistor Q1 converts the sensor current of the photodiode PD into a sensor voltage (VC1) having logarithmic characteristics in a weak inversion state. Next, the MOS transistor Q4 is turned on at predetermined timing so that the capacitors C1 and C2 become connected with each other. Thus, the electrical charge stored in the capacitor C1 moves to the capacitor C2, stored in the capacitor C2 and then retained as a terminal voltage of the capacitor C2. The terminal voltage of the capacitor C2 is taken out as an output voltage Vout from an output terminal 17.

With reference to FIGS. 2-5, the following paragraphs describe the behavior of the photosensor circuit 10 in relation to the voltages Vd, Vg1 and Vg2 supplied by the voltage controller 13.

Figure 2:
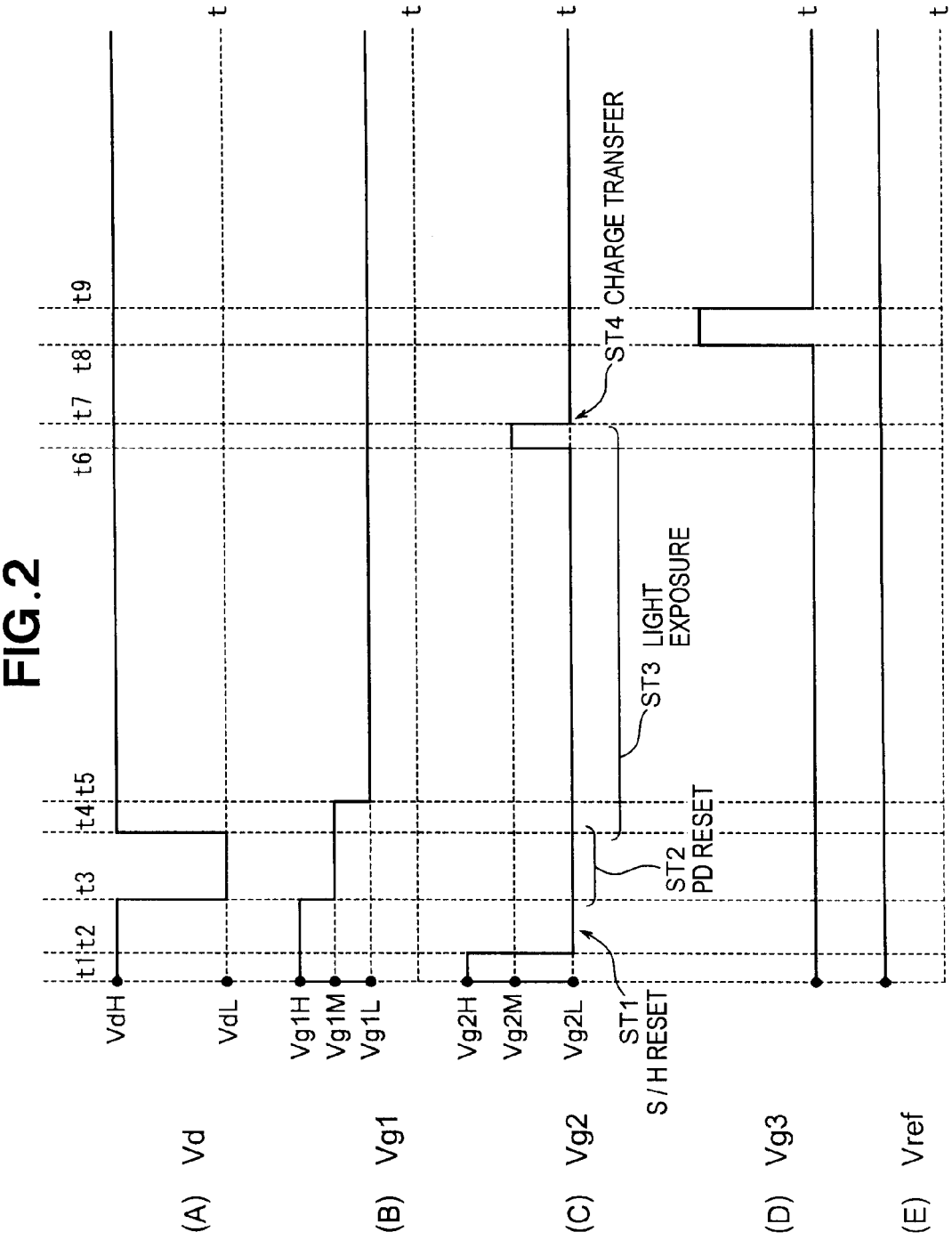
FIG. 2 is a timing chart showing states of signals in various portions of the photosensor circuit of FIG. 1.
Figure 3:
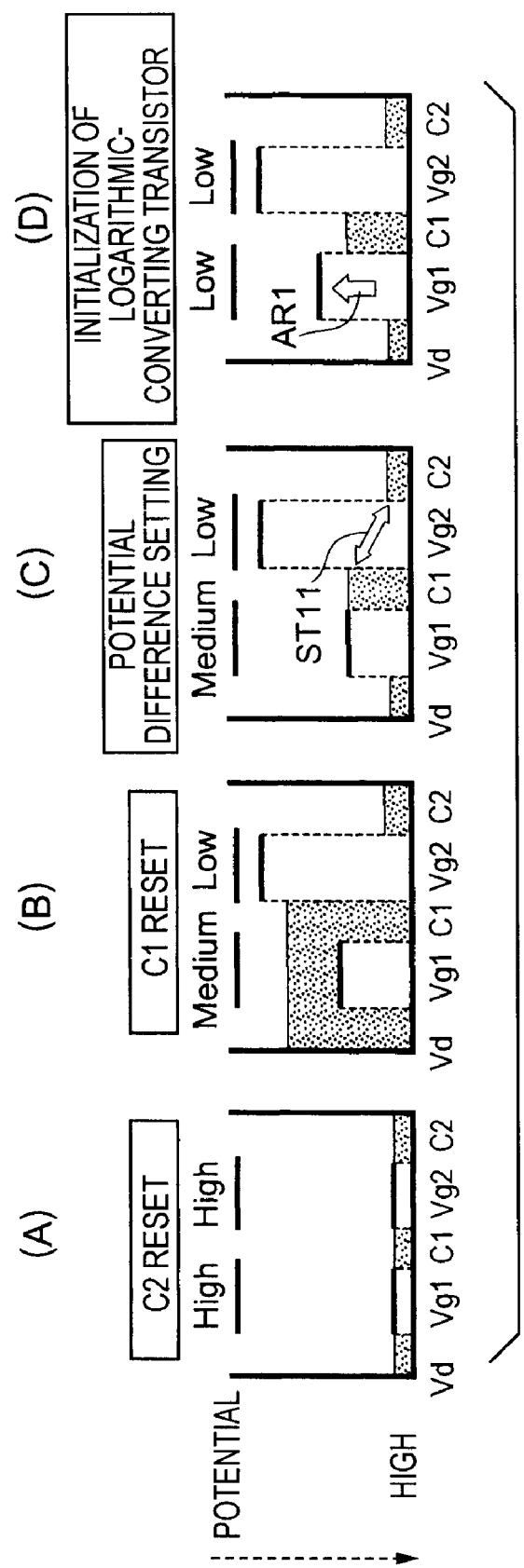
FIG. 3 is a diagram showing potentials in various portions of the photosensor circuit of FIG. 1 at the time of initial setting.
Figure 4:
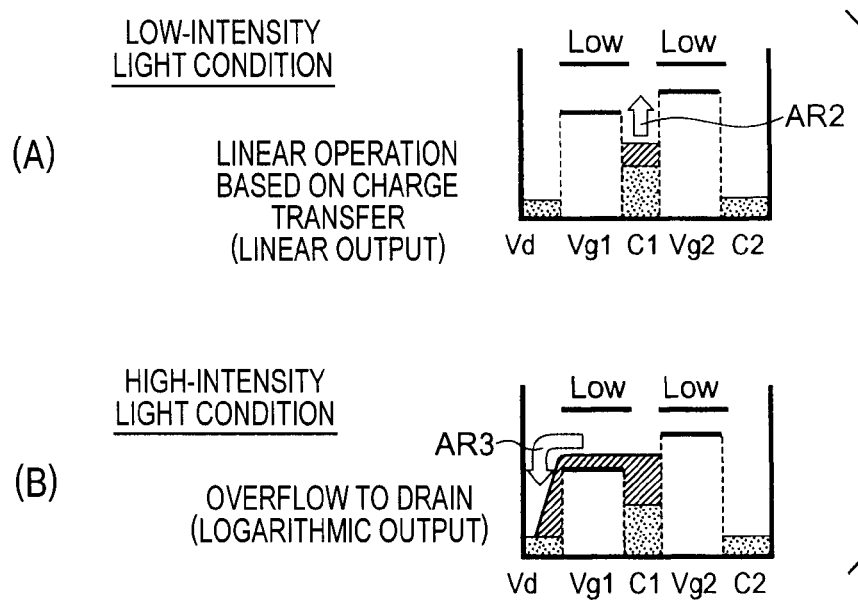
FIG. 4 is a diagram showing potentials in various portions of the photosensor circuit of FIG. 1 at the time of light exposure.
Figure 5:
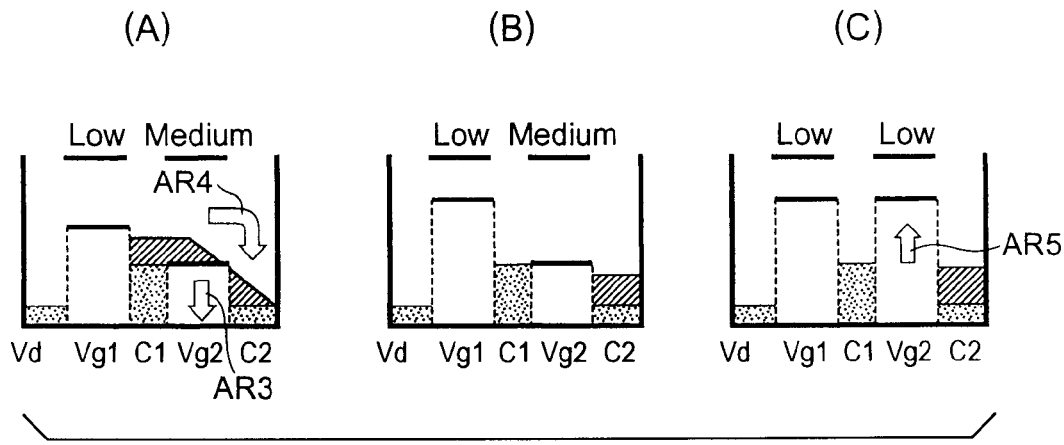
FIG. 5 is a diagram showing potentials in various portions at the time of electrical charge transfer in the photosensor circuit of FIG. 1.

The timing chart of FIG. 2 shows voltage levels and generation timing in various portions of the circuit for performing initial voltage setting and electrical charge transfer. FIGS. 3-5 are diagrams showing potentials, of which FIG. 3 is a diagram showing potentials at the time of the initial setting, FIG. 4 is a diagram showing potentials at the time of light exposure and FIG. 5 is a diagram showing potentials at the time of electrical charge transfer. In each of the potential diagrams of FIGS. 3-5, there are shown respective states of potentials of the drain 11$d$ and gate 11$g$ of the MOS transistor Q1 (Vd and Vg), a potential of the capacitor C1, a potential of the gate 16$g$ of the MOS transistor Q4 (Vg2), and a potential of the capacitor C2.

In FIG. 2, the drain voltage Vd of the MOS transistor Q1 is set to a high voltage value (VdH) and the gate voltages Vg1 and Vg2 of the MOS transistors Q1 and Q4 are set to high voltage values (Vg1H and Vg2H), respectively, at time points t1-t2. As a consequence, the drain 1id of the MOS transistor Q1 and the capacitors C1 and C2 are brought into a conductive state, and charge or discharge of the capacitor C2 for storing an electrical charge as a light signal is controlled to be set at a desired potential.

The above-described operational state is shown in (A) of FIG. 3, where the vertical axis represents the potential while the horizontal axis represents the drain 11$d$ of the MOS transistor Q1 (Vd), gate 11$g$ of the MOS transistor Q1 (Vg1), capacitor C1, gate 16$g$ of the MOS transistor Q4 (Vg2) and capacitor C2. In the figure, the potential represented by the vertical axis is shown as set to become higher in a top-to-bottom direction; the same explanation applies to (B)-(D) of FIG. 3, (A) and (B) of FIG. 4 and (A)-(C) of FIG. 5. In (A) of FIG. 3, the drain voltage Vd and the gate voltages Vg1 and Vg2 are each at a same high potential level, and the capacitors C1 and C2 are electrically connected with each other at the same potential level. The capacitor C2 is reset on the basis of the operational state shown in (A) of FIG. 3.

Next, at time point t2, the gate voltage Vg2 is set to a low level (Vg2L) to turn off the MOS transistor Q4, so that the capacitor C2 is placed in an opened state. The "opened state" of the capacitor C2 means a state where the capacitor C2 has been electrically disconnected from the capacitor C1, i.e. the sample/hold (S/H) function has been rest (as indicated at ST1).

Then, while the capacitor C2 is in the opened state, the drain voltage Vd of the MOS transistor Q1 is set to a low level (VdL) and the gate voltage Vg1 of the MOS transistor Q1 is set to a medium level (Vg1M), at time point t3. Then, the drain voltage Vd of the transistor Q1 is kept at the low level VdL till time point t4, and the gate voltage Vg1 of the transistor Q1 is kept at the medium level Vg1M till time point t5. By the drain voltage Vd being kept at the low level VdL for a time period from time point t3 to time point t4, an electrical charge stored in the capacitor C1 is discharged so that the photodiode PD is reset (as indicated at ST2) and the capacitor C1 too is reset.

The above-described operational state is illustrated in (B) of FIG. 3, which shows the drain voltage Vd at the low potential level, the gate voltage Vg1 at the intermediate potential level and the gate voltage Vg2 at the low potential level. In this state, the capacitors C1 and C2 are kept electrically disconnected with each other. The capacitor C1 is reset on the basis of the state shown in (B) of FIG. 3.

Later, at time point T4, the drain voltage Vd of the MOS transistor Q1 is set to a high level (VdH).

The above-described operational state is illustrated in (C) of FIG. 3, which shows the drain voltage Vd at the high potential level, the gate voltage Vg1 at the intermediate potential level and the gate voltage Vg2 at the low potential level. In this state, the capacitors C1 and C2 are kept electrically disconnected with each other, and a potential difference is established between the capacitors C1 and C2 so that the capacitor C1 is higher in potential than the capacitor C2 (as indicated at ST11).

Then, upon lapse of a predetermined time (t5-t4), i.e. at time point t5, the gate voltage Vg1 of the MOS transistor Q1 is set to the low level VG1L.

Here, the high level VdH of the drain voltage Vd of the MOS transistor Q1 and the medium level Vg1M of the gate voltage Vg1 of the transistor Q1 are set to satisfy the following relationship:

$$Vg1M-VdH<Vth1, \text{ and } Vg1M-VdL>Vth1,$$

where Vth1 indicates a threshold voltage of the MOS transistor Q1. In other words, the medium gate voltage value Vg1M of the MOS transistor Q1 is set so as not to exceed a sum of the drain voltage VdH and threshold voltage value of the MOS transistor Q1.

In (D) of FIG. 3, there is shown an operational state when the gate voltage Vg1 of the MOS transistor Q1 is in the process of being varied to the low level (Vg1L), and arrow AR1 indicates a direction in which the gate voltage Vg1 is varied to the low level (Vg1L). In other respects, the state shown in (D) of FIG. 3 is identical to the state shown in (C) of FIG. 3. Varying the gate voltage Vg1 as indicated by arrow AR1 can achieve linear-logarithmic characteristics based on the operation of the MOS transistor Q1.

In the above-described manner, the initial setting (initialization) of the photosensor circuit 10 is completed.

After that, a predetermined light exposure time (t4-t6) passes in the aforementioned state, during which an light exposure is carried out (as indicated at ST3). During the light exposure time (t4-t6), the sensor current flowing through the photodiode PD is stored in the capacitor C1 as an electrical charge.

After lapse of the light exposure time (t4-t6), the gate voltage Vg2 of the MOS transistor Q4 is set and kept at a medium level Vg2M only for a predetermined time period (t6-t7).

Here, the medium gate voltage Vg1M of the MOS transistor Q1 and the medium gate voltage value Vg2M of the MOS transistor Q4 are set to satisfy the following relationship:

$$Vg1M<Vg2M<Vg1M+Vth2,$$

where Vth2 indicates a threshold voltage of the MOS transistor Q4.

Through the above-described voltage control, the electrical charge stored in the capacitor C1 on the basis of the light exposure is transferred to and stored into the capacitor C2 during the period from time point t6 to time point t7 (as indicated at ST4 in FIG. 2).

For appropriate electrical charge transfer from the capacitor C1 to the capacitor C2, the charge transfer time T1(=t7-t6) is set to a time length not exceeding 100 microseconds (μs). The transfer time T1 is determined in accordance with an ON time of the MOS transistor Q4 based on the voltage applied to the gate 16$g$ of the MOS transistor Q4.

With the short transfer time T1 not exceeding 100 μs, it is possible to restrain the rise of the sensor output characteristics when the photosensor circuit 10 receives light L1 of high intensity or illuminance (e.g., in the range of 100- 1000 lx).

Because, setting the ON time of the charge-transferring MOS transistor Q4 to be below a predetermined time can prevent the electrical charge transfer between the capacitors C1 and C2 from reaching an equilibrium condition. More specifically, if the charge-transferring MOS transistor Q4 continues to be ON even after completion of the charge transfer between the capacitors C1 and C2, the potentials of the capacitors C1 and C2 would fall due to an electrical charge generated by input of strong light, as a result of which the potential change amount of the capacitor C2 following the charge transfer from the capacitor C1 to the capacitor C2 would rapidly increase. Because a signal input range in a subsequent-stage sensor circuit section is limited according to the specifications of the circuit, the measurable upper limit of the incident light intensity lowers, so that the rapid increase in the potential change amount in the capacitor C2 would result in narrowing of the dynamic range. Therefore, by reducing the ON time of the charge-transferring MOS transistor Q4, the instant embodiment can effectively restrain a rapid increase of the potential change amount of the capacitor C2 even when strong light has been input. As a result, the instant embodiment can significantly enlarge the dynamic range.

After that, the gate voltage Vg2 is set to the low level (Vg2L) to turn off the MOS transistor Q4 so that the capacitor C2 is placed in the opened state, and then the terminal voltage of the capacitor C2 is taken out as a sensor output signal.

The above-described operational sequence is repeated in the photosensor circuit 10 periodically at predetermined timing.

Figure 6:
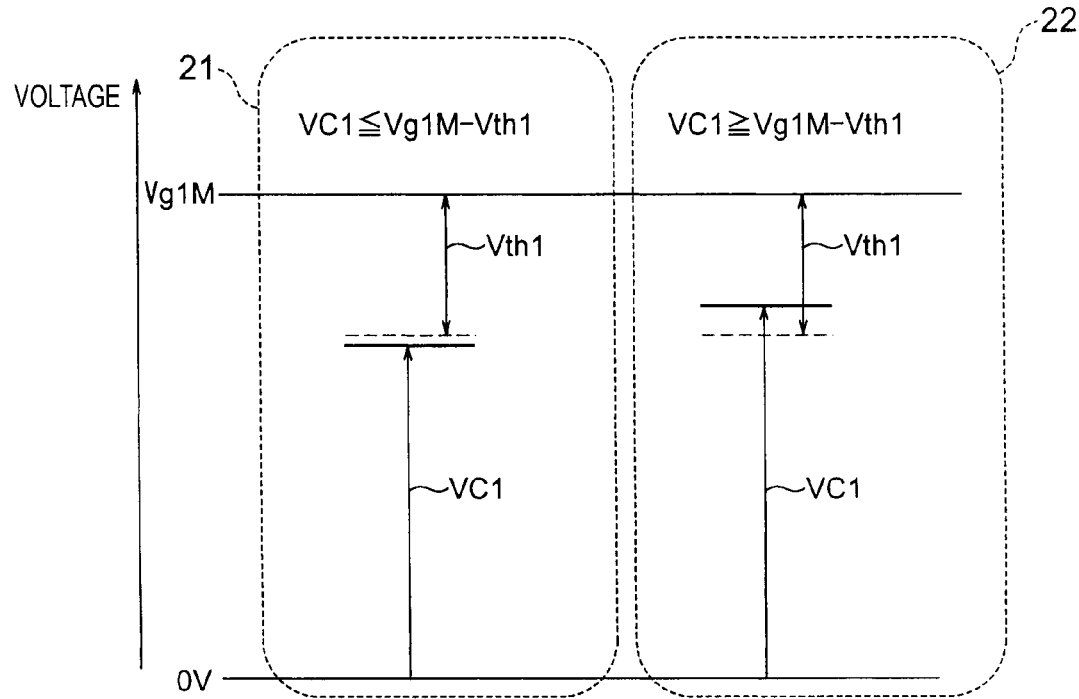
FIG. 6 is a diagram explanatory of relationship among a medium gate voltage value of a MOS transistor, threshold voltage value of the transistor and a terminal voltage of a photodiode in the photosensor circuit of FIG. 1.
Figure 7:
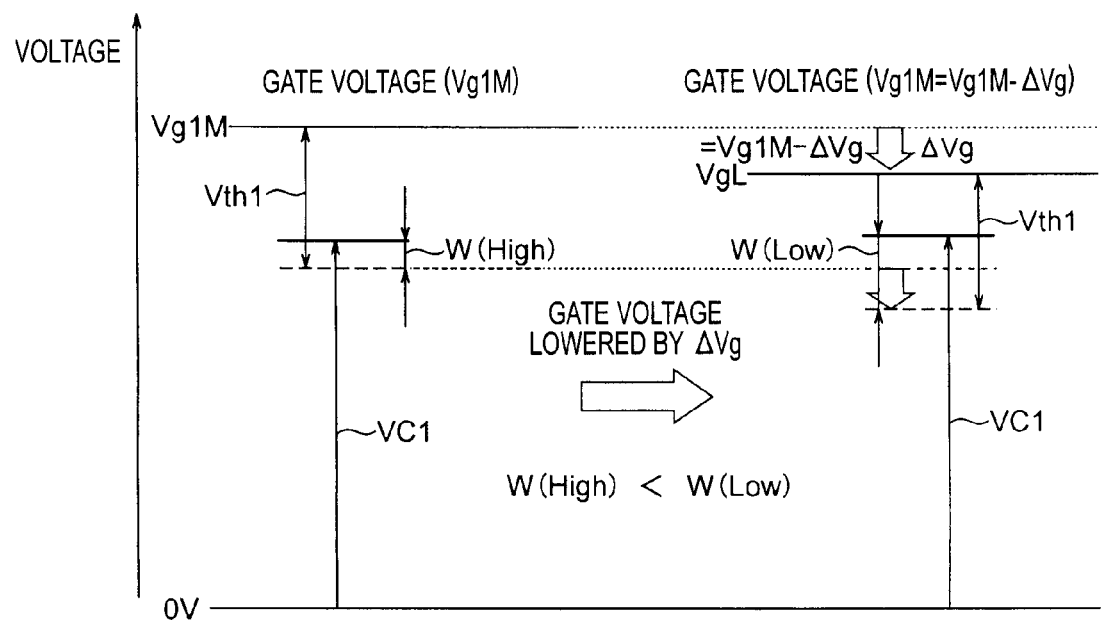
FIG. 7 is a diagram explanatory of relationship among the medium gate voltage of the MOS transistor, threshold voltage of the transistor and terminal voltage of the photodiode in the photosensor circuit of FIG. 1.
Figure 8:
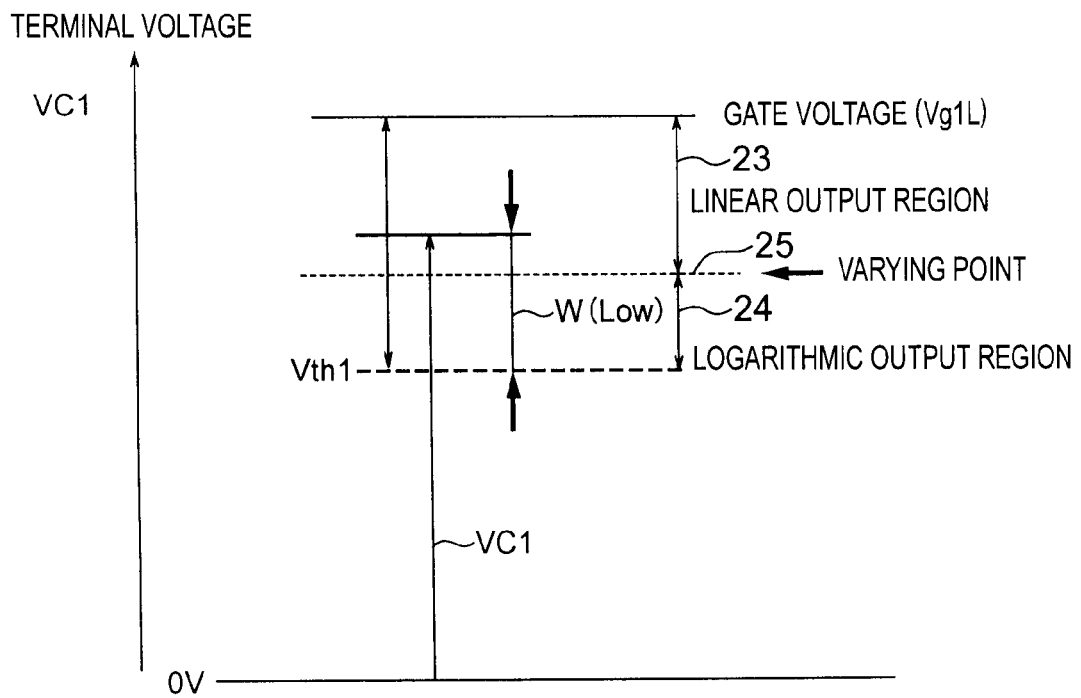
FIG. 8 is a diagram explanatory of relationship among a low gate voltage and threshold voltage of the MOS transistor, terminal voltage of the photodiode and linear output characteristics of the photosensor circuit of FIG. 1.

With reference to FIGS. 6-8, the following paragraphs describe the behavior of the photosensor circuit 10 following time point t4, i.e. the start of the light exposure.

FIG. 6 shows relationship among the medium gate voltage value Vg1M of the MOS transistor Q1, the threshold voltage value of the MOS transistor Q1 and the terminal voltage VC1 of the photodiode PD.

Immediately after time point t4 is reached, the terminal voltage VC1 of the photodiode PD rapidly increases, at a speed on the order of nanoseconds or less, to a predetermined level, lower than the medium gate voltage value Vg1M of the MOS transistor Q1 by an amount corresponding to the threshold voltage value Vth1 of the MOS transistor Q1, as shown in a left-side block 21 of FIG. 6.

Then, as the time further passes, the terminal voltage VC1 of the photodiode PD further increases so that the potential difference between the medium gate voltage value Vg1M of the MOS transistor Q1 and the terminal voltage VC1 of the photodiode PD becomes smaller than the threshold voltage value Vth1 of the transistor Q1. The reason why the terminal voltage VC1 of the photodiode PD increases like this is that a sub-threshold current is caused to flow as the channel impedance of the MOS transistor Q1 increases.

At time point t5 when the circuit 10 has transient characteristics with the sub-threshold current flowing as noted above, the medium gate voltage value Vg1M of the MOS transistor Q1 is switched to the low gate voltage value Vg1L.

Time interval between time point t4 and time point t5 is set, for example, to the order of microseconds. By thus setting the time interval, the terminal voltage VC1 of the photodiode PD reaches a condition where the sub-threshold current flows.

The purpose for setting the potential difference between the medium gate voltage value Vg1M of the MOS transistor Q1 and the high drain voltage VdH to be smaller than the threshold voltage value Vth1 of the MOS transistor Q1 is to set the terminal voltage VC1 of the photodiode PD to the condition where the sub-threshold current flows. Further, the purpose for switching the medium gate voltage value Vg1M of the MOS transistor Q1 to the low gate voltage Vg1L at time point t5 is to set a potential difference W(=VC1-(Vg1L-Vth1)) to a great value, i.e. to set the terminal voltage VC1 of the photodiode PD to be above a level that is lower by the threshold voltage value Vth1 than the gate voltage value Vg1L.

By setting such a great potential difference W, the gate of the MOS transistor Q1 can be turned off, so that the photo-electrically-converted electrical charge can be stored at the time of the light exposure in response to low-intensity light and thus the terminal potential VC1 of the photodiode PD varies linearly. Range in which the terminal potential VC1 of the photodiode PD varies linearly will hereinafter be referred to as "linear output region". Such an operational state is illustrated in (A) of FIG. 4, where arrow AR2 indicates increase of the electrical charge stored in the capacitor C1. Amount of the electrical charge stored in the capacitor C1 will never exceed the gate potential Vg1L. Further, at the time of the light exposure, the gate of the MOS transistor Q1 is turned on in response to high-intensity light and the circuit operates in accordance with a sub-threshold value, so that the photo-electrically-converted electrical charge flows through the MOS transistor Q1 and thus the terminal potential VC1 of the photodiode PD varies logarithmically. Range in which the terminal potential VC1 of the photodiode PD varies logarithmically will hereinafter be referred to as "logarithmic output region". Such an operational state is illustrated in (B) of FIG. 4, where arrow AR3 indicates the amount of the electrical charge, stored in the capacitor C1, which has exceeded the gate potential Vg1L and over-flown to the drain side.

Increasing the above-mentioned potential difference W can enlarge the linear output region. The reason why the linear output region can be enlarged will be set forth below with reference to FIG. 7.

FIG. 7 shows relationship among the gate voltage Vg1 of the MOS transistor Q1, the threshold voltage value Vth1 of the MOS transistor Q1 and the terminal voltage VC1 of the photodiode PD. By decreasing the gate voltage Vg1, it is possible to change the relationship of the terminal voltage VC1 of the photodiode PD with the gate voltage value Vg1 and threshold voltage value Vth1 while maintaining the terminal voltage VC1 of the photodiode PD. Namely, decreasing the gate voltage Vg1 can change the potential difference W indicated as a particular range in FIG. 7.

In FIG. 7, there is shown a change from potential relationship indicated in a left-side section of the figure over to potential relationship indicated in a right-side section of the figure where the gate voltage Vg1 has been lowered from the medium gate voltage value Vg1M by ΔVg to take the low gate voltage Vg1L. Namely, in FIG. 7, the range W (High) (=VCL-(Vg1M-Vth1)) based on the left-side potential relationship changes to the range W (Low) (=VCL-(Vg1L-Vth1)) based on the right-side potential relationship. In this case, relationship of VgL=Vg1M-ΔVg is established regarding the gate voltage Vg1, from which relationship of W (Low)>W(High) can be derived. Namely, changing the gate voltage Vg1 by ΔVg from the medium gate voltage value Vg1M to the low gate voltage Vg1L can enlarge the range (potential difference) W.

Further, FIG. 8 shows relationship among the low gate voltage Vg1L and threshold voltage value Vth1 of the MOS transistor Q1, terminal voltage VC1 of the photodiode PD and linear output characteristics, etc. In FIG. 8, 23 indicates the linear output region, and 24 the logarithmic output region. Boundary 25 between the linear output region 23 and the logarithmic output region 24 represents a changing point.

As seen in FIG. 8, the terminal voltage VC1 of the photodiode PD can be set to a desired potential in the linear output region 23. Thus, where the present invention is applied to an image sensor (image pickup region), such as a two-dimensional MOS-type image sensor, composed of a plurality of pixels each implemented by the inventive photosensor circuit, it can effectively operate to minimize or eliminate output non-uniformness among the individual photosensor circuits resulting from variations in threshold voltage of the individual pixels based on MOS transistors.

Further, with reference to FIGS. 9-11, a description will be given about a manner in which output variations between, for example, two photo-sensor circuits (pixels) A and B are minimized according to the principles of the present invention.

Figure 9:
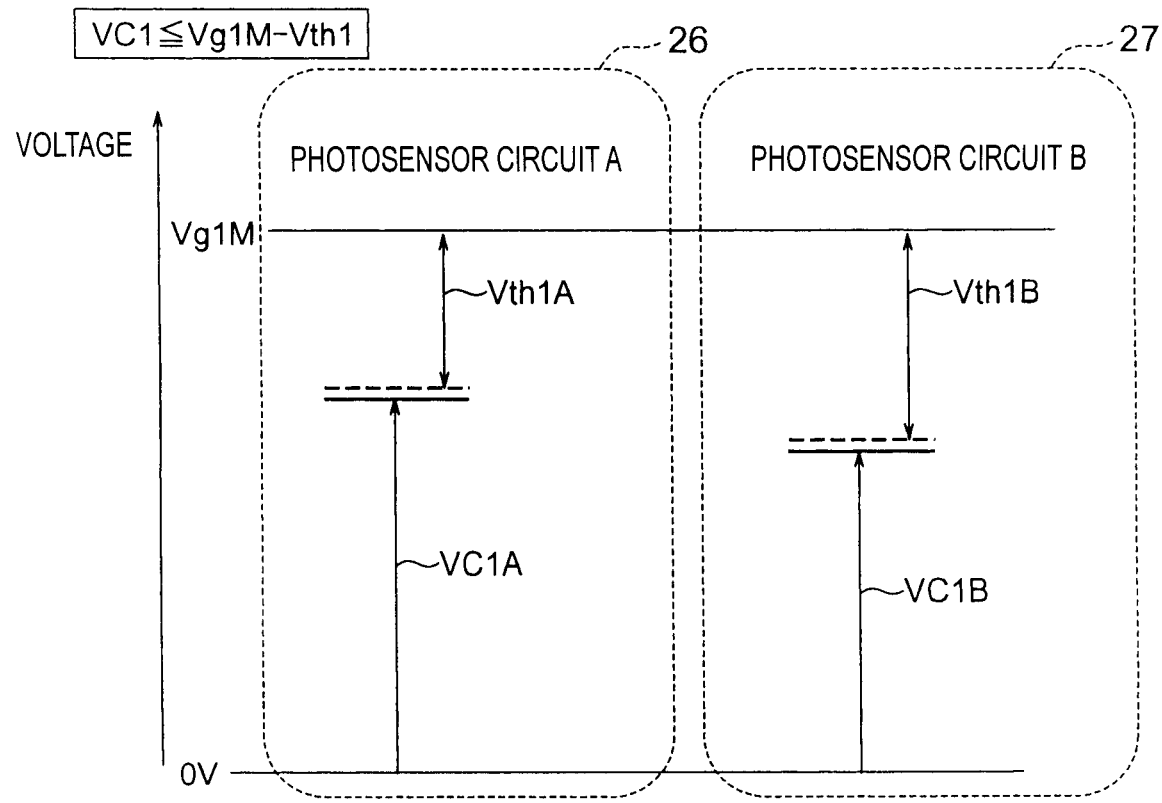
FIG. 9 is a diagram explanatory of relationship among medium gate voltages of MOS transistors, threshold voltage values of the transistors and terminal voltages of photodiodes in two photosensor circuits each constructed according to the first embodiment of the present invention.

Following time point t4, the terminal voltage VC1 of the photodiode PD in each of the photosensor circuits A and B, as shown in FIG. 9, rapidly increases, at a speed on the order of nanoseconds or less, to a predetermined level that is lower than the set gate voltage value of the MOS transistor Q1 by a potential difference corresponding to the threshold voltage Vth1 of the MOS transistor Q1. At that time, the photosensor circuits A and B produce different terminal voltages VCA1 and VC1B as shown in blocks 26 and 27, respectively, of FIG. 9, because the threshold voltage Vth1 of the MOS transistor Q1 differs between the photosensor circuits A and B.

Figure 10:
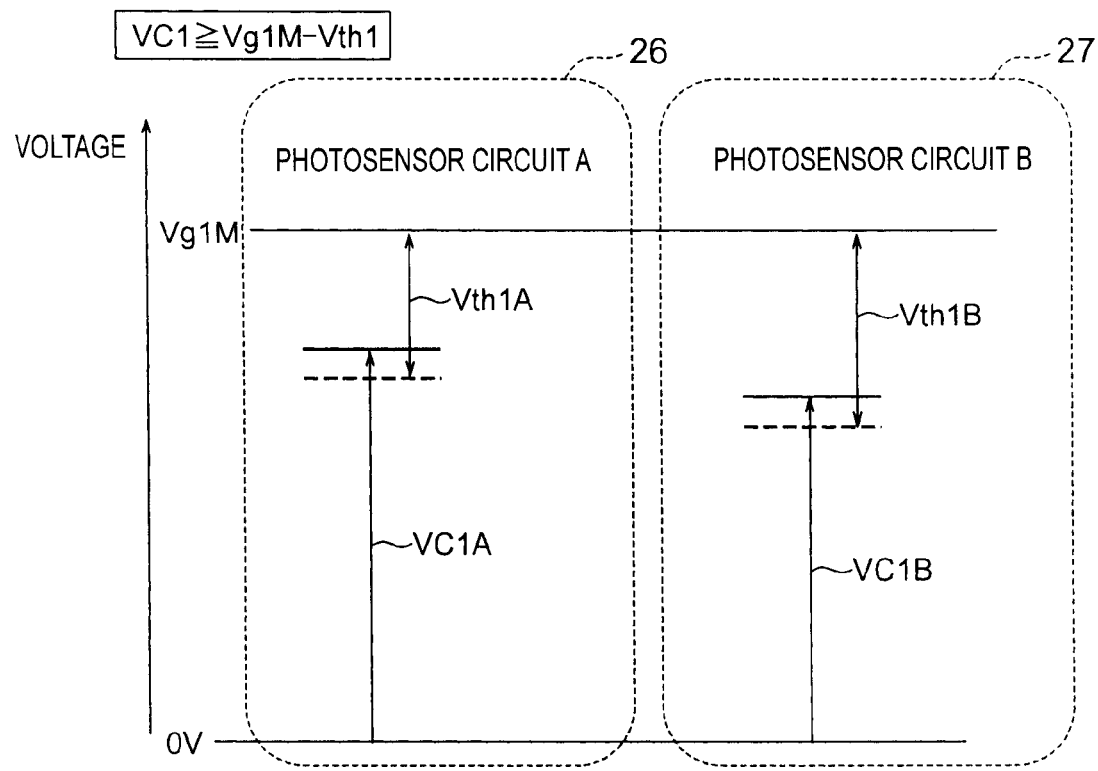
FIG. 10 is a diagram explanatory of relationship among the medium gate voltages of the MOS transistors, threshold voltage values of the transistors and terminal voltages of the photodiodes in the two photosensor circuits each constructed according to the first embodiment of the present invention.

Then, as the time further passes, the relationship changes into one shown in FIG. 10. Namely, in each of the photosensor circuits A and B shown in blocks 26 and 27, respectively, of FIG. 10, the potential difference between the medium gate voltage value Vg1M of the MOS transistor Q1 and the terminal voltage of the photodiode PD falls below the threshold voltage (Vth1A or Vth1B) of the MOS transistor Q1 as the terminal voltage (VC1A or VC1B) of the photodiode PD increases. Because the channel impedance of the MOS transistor Q1 increases, a sub-threshold current is caused to flow so that the terminal voltage (VC1A or VC1B) of the photodiode PD rises.

Figure 11:
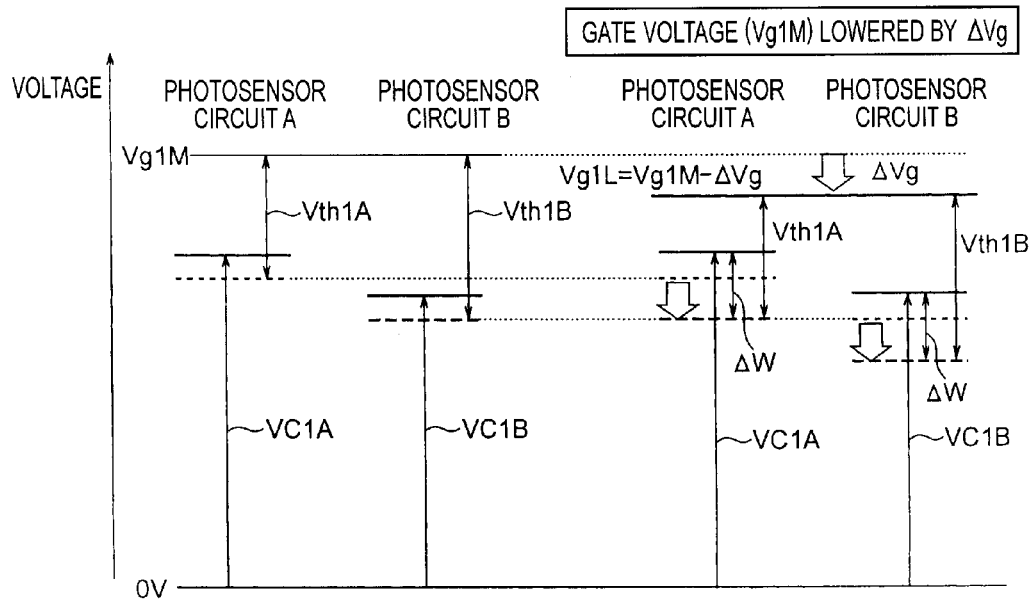
FIG. 11 is a diagram explanatory of relationship among the medium gate voltages of the MOS transistors, threshold voltage values of the transistors and terminal voltages of the photodiodes in the two photosensor circuits after the medium gate voltages are lowered.

Namely, if the gate voltage value Vg1M of the MOS transistor Q1 is switched to the low gate voltage value Vg1L while the circuit 10 has transient characteristics with the sub-threshold current flowing as noted above, the relationship changes into one shown in FIG. 11. Namely, because the potential difference $\Delta W(=W(Low)-W(High))$ is set on the basis of a difference ($\Delta Vg$) between the medium gate voltage value Vg1M and low gate voltage value Vg1L of the MOS transistor Q1, it can be a potential difference independent of a difference in the threshold voltage between the MOS transistors Q1 constituting the photosensor circuits A and B. Thus, the same potential difference $\Delta W(=W(Low)-W(High))$ is set in the different photosensor circuits A and B.

According to the present invention, where the potential difference $\Delta W$ can be set at a desired value, it is possible to set a desired potential of the terminal, which is the varying point between the range presenting the linear output characteristic region and the range presenting the logarithmic output characteristic region, relative to the terminal voltage VC1 of the photodiode PD that becomes a sensor detection potential of the corresponding photosensor circuit in a dark condition, and it is also possible to control the two ranges as desired. As a result, the present invention can effectively eliminate differences in output between different photosensor circuits (i.e., different pixels).

Upon lapse of a predetermined time after the aforementioned initial setting and light exposure, the electrical charge is transferred from the capacitor C1 to the capacitor C2 in a manner as illustrated in (A)-(C) of FIG. 5. First, the gate voltage Vg2 is changed to the medium voltage value (Vg1M) as indicated by arrow A3 on the basis of the aforementioned relationship "Vg1M<Vg2M<Vg1M+Vth2", at which time the transferring gate of the MOS transistor Q4 is not fully opened. In this way, the electrical charge stored in the capacitor C1 is transferred to the capacitor C2 as indicated by arrow A4. Finally, the potential of the gate voltage Vg2 decreases, as indicated by arrow AR5 in (C) of FIG. 5, to the low voltage value Vg2L.

Because the potential difference is set, as indicated at ST11 in (C) of FIG. 3, on the basis of the relationship between the potentials of the capacitor C1 and capacitor C2, the electrical charge can be effectively transferred from the capacitor C1 to the capacitor C2, so that the electrical charge stored in the capacitor C1 can be used efficiently. As a result, it is possible to significantly enhance the detection sensitivity of the photosensor circuit 10.

Figure 12:
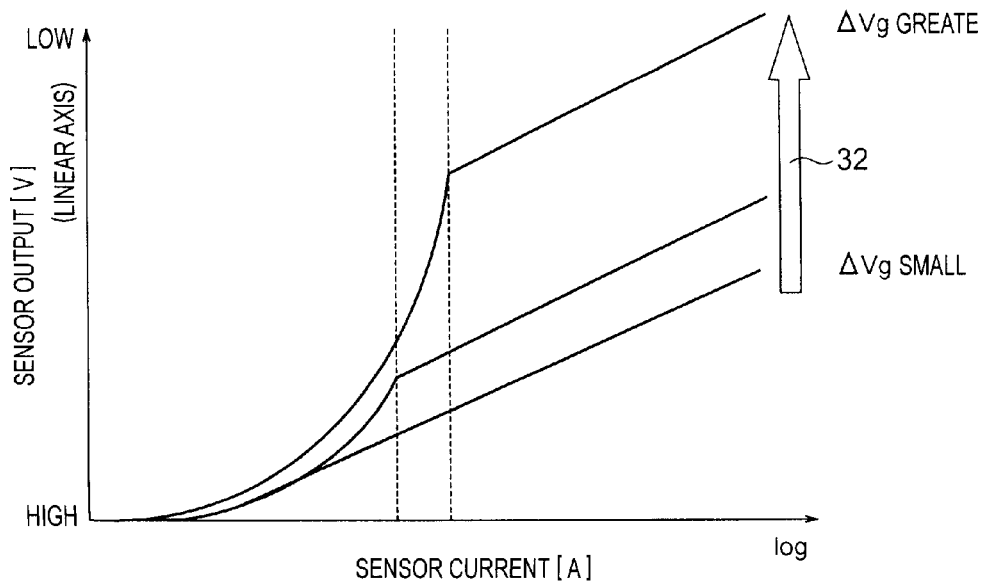
FIG. 12 is a diagram showing sensor output variation characteristics of the photosensor circuit according to the first embodiment of the present invention.

FIG. 12 shows a pattern of the sensor output characteristics obtained by the photosensor circuit 10 constructed in the above-described manner, in which the horizontal axis of FIG. 12 is plotted as a logarithmic scale. By switching as desired the medium gate voltage value Vg1M of the MOS transistor Q1, the photosensor circuit 10 is allowed to output a sensor signal in an optimal manner matching with an image picking-up condition. As the difference, with the low gate voltage value Vg1L, of the medium gate voltage value Vg1M ($\Delta Vg$) is changed from "small" to "great", the sensor output characteristics change as indicated by arrow 32.

Figure 13:
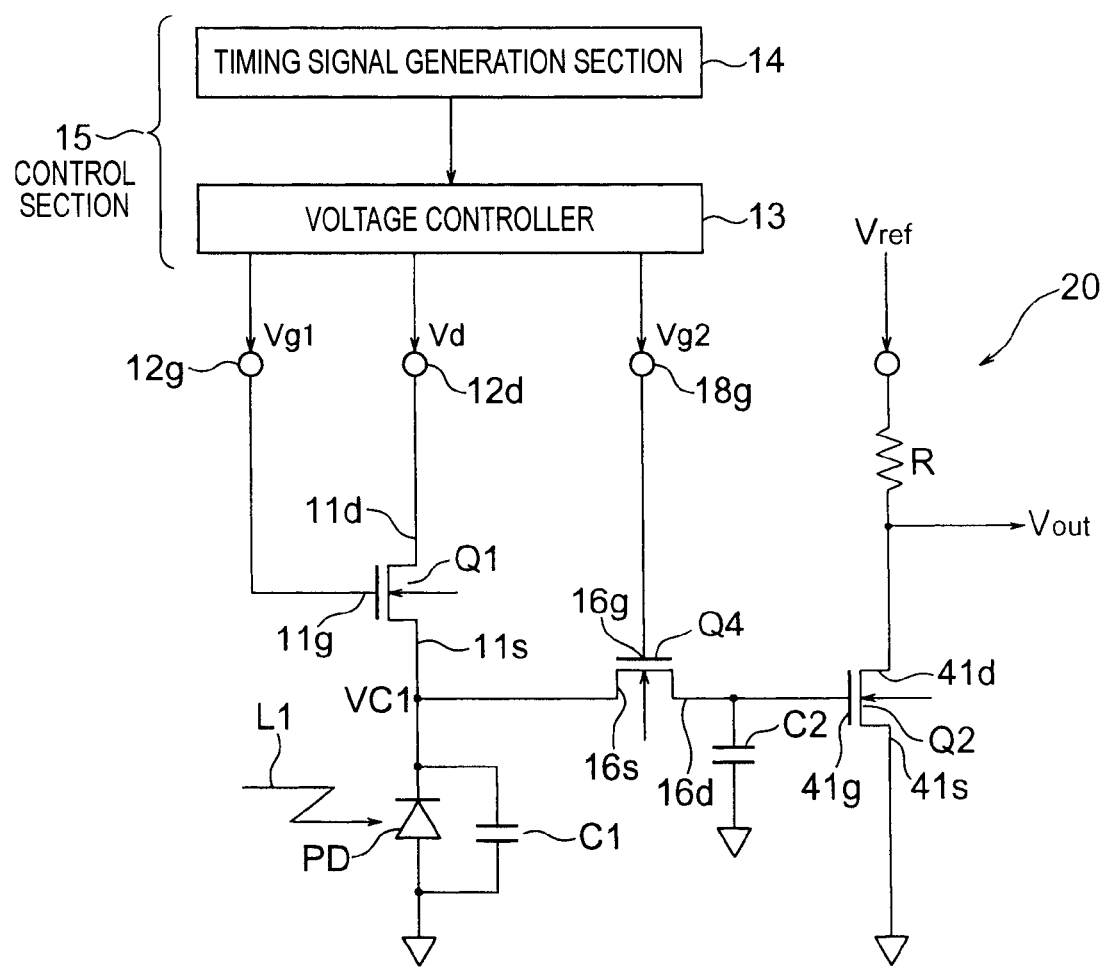
FIG. 13 is a circuit diagram showing a construction of a photosensor circuit in accordance with a second embodiment of the present invention.
Figure 14:
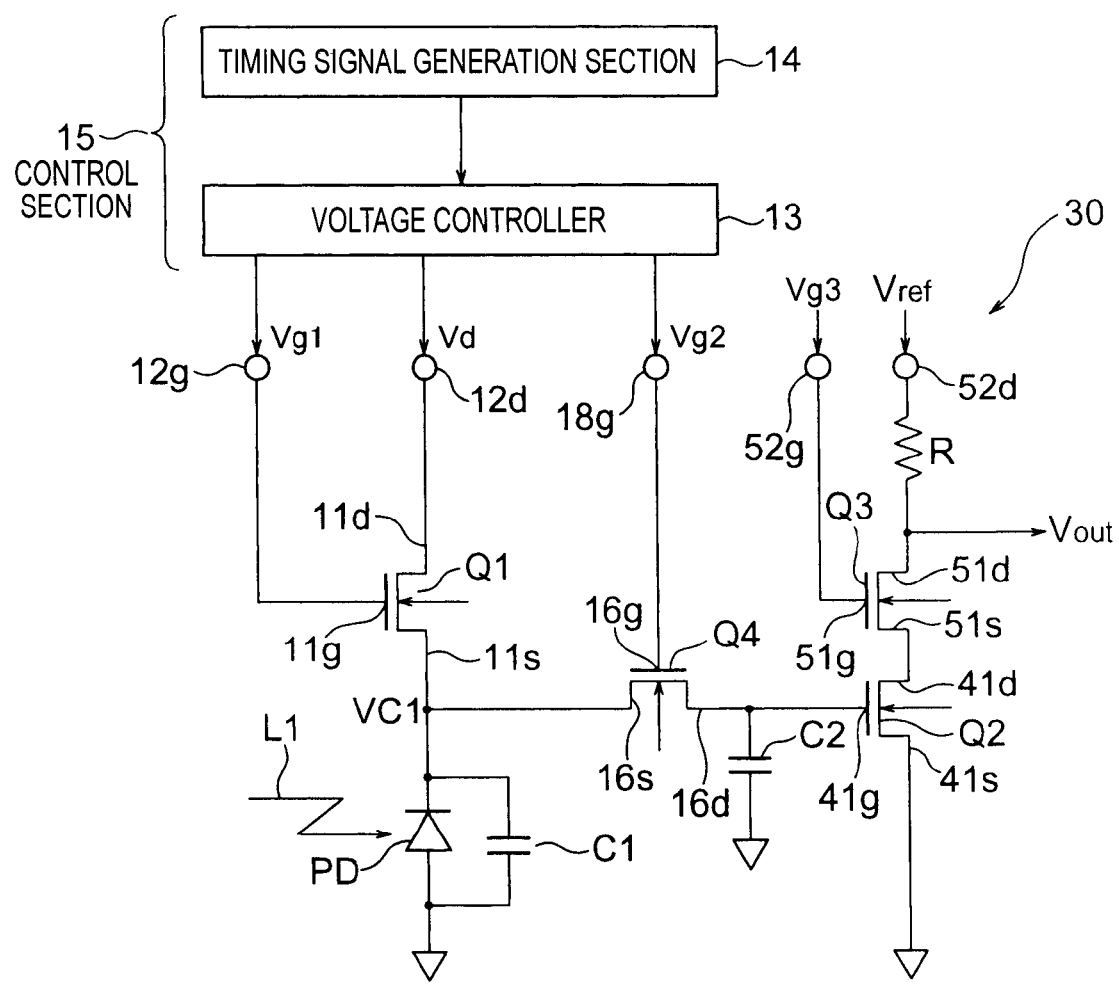
FIG. 14 is a circuit diagram showing a construction of a photosensor circuit in accordance with a third embodiment of the present invention.

FIG. 13 shows a photosensor circuit in accordance with a second embodiment of the present invention, and FIG. 14 shows a photosensor circuit in accordance with a third embodiment of the present invention.

The photosensor circuit 20 according to the second embodiment is different from the above-described photosensor circuit 10 according to the first embodiment in that it further includes a MOS transistor Q2 for amplifying a sensor output voltage. In FIG. 13, elements substantially identical to the elements of the first embodiment are indicated by the same reference characters as in FIG. 1 and will not be detailed to avoid unnecessary duplication. The MOS transistor Q2 is an amplifying MOS transistor for amplifying a sensor voltage that is output as a terminal voltage of the capacitor C2.

In the photosensor circuit 20, the output terminal of the capacitor C2 or the drain 16d of the MOS transistor Q4 is coupled to a gate 41g of the MOS transistor Q2. Drain voltage Vref is supplied by the voltage controller 13 to a drain terminal 42d of the MOS transistor Q2 via a resistor R, and a source 41s of the MOS transistor Q2 is connected to the earth terminal. Amplified sensor output voltage Vout is taken out from a drain 41d of the MOS transistor Q2.

The photosensor circuit 30 according to the third embodiment is different from the above-described photosensor circuit 20 in that it further includes a MOS transistor Q3. In FIG. 14, elements substantially identical to the elements of the second embodiment are indicated by the same reference characters as in FIG. 13 and will not be detailed to avoid unnecessary duplication. The MOS transistor Q3 is an output selecting MOS transistor for selectively outputting a voltage signal from the amplifying MOS transistor Q2.

In the photosensor circuit 30, the drain 41d of the MOS transistor Q2 is connected with a source 51s of the MOS transistor Q3. Gate voltage Vg3 is supplied to a gate terminal 52g of the MOS transistor Q3. Resistor R is connected at one terminal to a drain 51d of the MOS transistor Q3, and a voltage Vref is supplied to the other terminal 52d of the resistor R. Sensor output voltage Vout is taken out from the drain 51d of the MOS transistor Q3.

Respective voltage waveforms of the aforementioned gate voltage Vg3 and voltage Vref are shown in (D) and (E) of FIG. 2. The gate voltage Vg3 is generated for a time period from time point t8 to time point t9, and the voltage Vref is applied with a predetermined voltage level. The photosensor circuit 30 is selected upon turning-on of the gate voltage Vg3 and outputs the sensor voltage.

In each of the photosensor circuits 20 and 30 constructed in the above-described manner, given control signals for driving the various elements so that electrical signals corresponding to incident light L1 can be obtained, as illustratively shown in FIG. 14, as in the photosensor circuit 10 according to the first embodiment.

Figure 15:
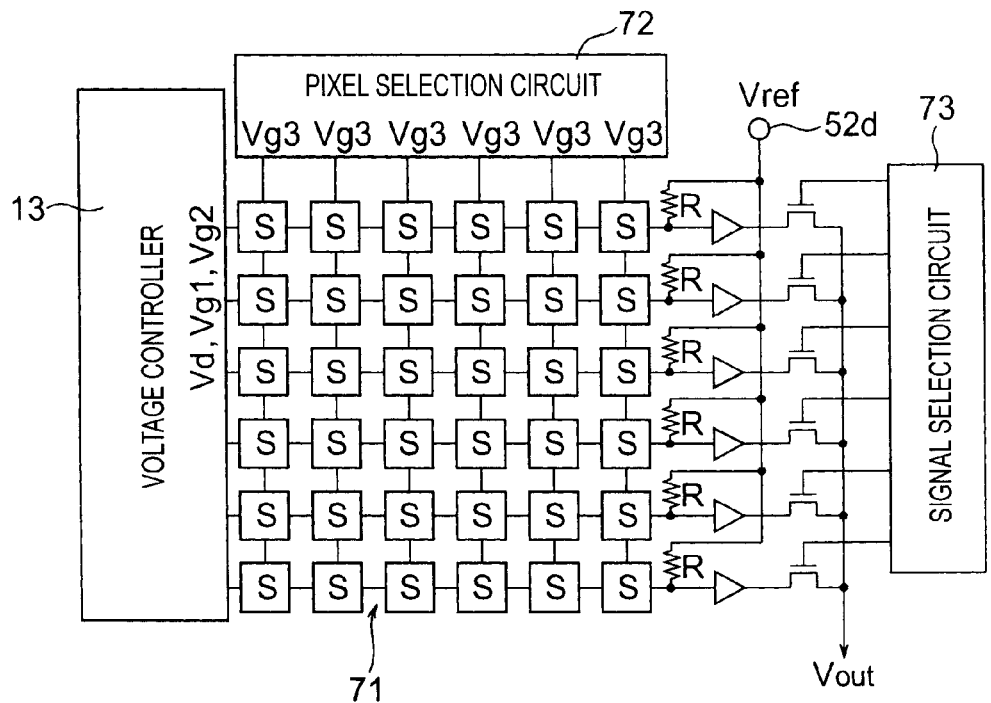
FIG. 15 is a circuit diagram showing an example construction of an image sensor constructed using a plurality of photosensor circuits constructed according to the third embodiment of the present invention.

FIG. 15 shows an example construction of an image sensor including a rectangular image pickup region 71 arranged in a two-dimensional matrix of pixels each comprising the photosensor circuit 30 of FIG. 14. In FIG. 15, reference numeral 13 indicates the voltage controller, 72 a common pixel selection circuit provided for individual pixels S, and 73 a signal selection circuit for sequentially outputting pixel signals of each of the pixels S. The voltage controller 13 supplies the voltages Vd, Vg1 and Vg2, the pixel selection circuit 73 supplies the voltage Vg3, and the voltage Vref is supplied to the terminal 52d of the resistor R.

Whereas the MOS transistors in each of the embodiments have been described as n-channel type MOS transistors, they may of course be p-channel type MOS transistors.

The constructions, shapes, sizes, positional arrangements, numerical values, etc. explained above in relation to the embodiments are just illustrative, and the present invention should not be construed as limited to the explained embodiments and may be modified variously as long as it does not depart from the technical scope defined in the appended claims.

The present invention can be advantageously used as a photosensor circuit (or pixel) of a one- or two-dimensional MOS-type image sensor.

Obviously, various minor changes and modifications of the present invention are possible in light of the above teaching. It is therefore to be understood that within the scope of the appended claims the invention may be practiced otherwise than as specifically described.

What is claimed is:

1. A photosensor circuit comprising:
   a photoelectric conversion element for converting a light signal into a current signal;
   a first MOS transistor for converting the current signal, output by said photoelectric conversion element, into a voltage signal having a logarithmic characteristic in a weak inversion state;
   a first capacitor element connected to a voltage detection terminal of said photoelectric conversion element;
   a second capacitor element for keeping the voltage signal;
   a second MOS transistor for controlling electrical charge transfer between said first capacitor element and said second capacitor element; and
   control means for supplying gate voltages and drain voltages to said first MOS transistor and said second MOS transistor,
   said control means performing voltage control to:
   set the drain voltage of said first MOS transistor at a high drain voltage value (VdH) and the gate voltage of said first MOS transistor at a high voltage value (Vg1H) for a first predetermined time period, set the gate voltage of said second MOS transistor at a high voltage value (Vg2H) only for a second predetermined time period, and control charge or discharge of said second capacitor element, provided for storing the electrical charge as a light signal, to thereby set said capacitor element at a predetermined potential;
   then set the drain voltage of said first MOS transistor at a low drain voltage value (VdL) after turning off said second MOS transistor to place said second capacitor element in an opened state and set the gate voltage of said first MOS transistor at a medium potential (Vg1M) to thereby discharge the electrical charge of said first capacitor element;
   then set the drain voltage of said first MOS transistor at the high drain voltage value (VdH) and then, after passage of a third predetermined time, set the gate voltage of said first MOS transistor at a low voltage (Vg1L) and set the high drain voltage value (VdH) and medium potential (Vg1M) so as to satisfy relationship of Vg1M−VdH<Vth1 and relationship of Vg1M−VdL>Vth1, where Vth1 represents a threshold voltage of said first MOS transistor;
   then, after passage of a predetermined time, set the gate voltage of said second MOS transistor at a predetermined voltage value (Vg2M) only for a fourth predetermined time period and set the medium potential (Vg1M) and predetermined voltage value (Vg2M) so as to satisfy relationship of Vg1M<Vg2M<Vg1M+Vth2 where Vth2 represents a threshold voltage value of said second MOS transistor, to thereby transfer the electrical charge of said first MOS transistor to said second MOS transistor; and
   then set a terminal voltage of said second MOS transistor as a sensor output signal after turning off said second MOS transistor to place said second capacitor element in the opened state.

2. A photosensor circuit according to claim 1 wherein said control means switches the medium potential and low voltage of said first MOS transistor to desired levels.

3. A photosensor circuit according to claim 1 which further comprises a third MOS transistor for amplifying the terminal voltage of said second MOS transistor.

4. A photosensor circuit according to claim 3 which further comprises a fourth MOS transistor for selectively outputting a voltage signal output by said third MOS transistor.

5. A photosensor circuit according to claim 1 wherein said fourth predetermined time period is set so as not to exceed 100 μsec.

6. An image sensor comprising an image pickup region having a plurality of pixels each implemented by the photosensor circuit recited in claim 1.

* * * * *